US006967324B2

(12) United States Patent
Goodley et al.

(10) Patent No.: US 6,967,324 B2
(45) Date of Patent: Nov. 22, 2005

(54) MICRO MATRIX ION GENERATOR FOR ANALYZERS

(75) Inventors: Paul C. Goodley, Cupertino, CA (US); Jean-Luc Truche, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/644,463

(22) Filed: Aug. 20, 2003

(65) Prior Publication Data

US 2004/0036019 A1 Feb. 26, 2004

Related U.S. Application Data

(63) Continuation-in-part of application No. 09/505,910, filed on Feb. 17, 2000, now Pat. No. 6,627,880.

(51) Int. Cl.[7] ........................ H01J 49/00; H01J 49/40; B01D 54/44

(52) U.S. Cl. .................. 250/288; 250/423 R; 250/282; 250/281; 250/428

(58) Field of Search ................................ 250/288, 286, 250/281, 282, 423 R

(56) References Cited

U.S. PATENT DOCUMENTS

| | | | | |
|---|---|---|---|---|
| 4,748,043 | A | 5/1988 | Seaver et al. | |
| 4,861,988 | A | 8/1989 | Henion et al. | |
| 4,926,056 | A | 5/1990 | Spindt | |
| 5,495,108 | A | 2/1996 | Apffel, Jr. et al. | |
| 5,504,329 | A | 4/1996 | Mann et al. | |
| 5,559,326 | A | 9/1996 | Goodley et al. | |
| 5,752,663 | A | 5/1998 | Fischer et al. | |
| 5,868,322 | A | 2/1999 | Loucks, Jr. et al. | |
| 6,207,954 | B1 | 3/2001 | Andrien, Jr. et al. | |
| 6,326,616 | B1 | 12/2001 | Andrien, Jr. et al. | |
| 6,350,617 | B1 | 2/2002 | Hindsgaul et al. | |
| 6,764,720 | B2 * | 7/2004 | Pui et al. | 427/479 |
| 6,800,849 | B2 * | 10/2004 | Staats | 250/288 |
| 6,803,568 | B2 * | 10/2004 | Bousse et al. | 250/288 |

FOREIGN PATENT DOCUMENTS

| | | |
|---|---|---|
| WO | WO 98/35376 | 8/1998 |

OTHER PUBLICATIONS

Kostianer and Bruins, The Use of Multiple Sprayer System in the Electrospray Mass Spectrometry, 41st ASMS Conference on Mass Spectrometry, 1993, pp. 744a-744b.

Larry Licklider, Xuan-Qi Wang, Amish Desai, Yu-Chong Tai and Terry D. Lee, A Micromachined Chip-Based Electrospray Source for Mass Spectrometry, Analytical Chemistry, vol. 72, No. 2. 367-375, Jan. 15, 2000.

Longfei Jlang and Mehdi Molni, Development of Multi-ESI-Sprayer, Multi-Atmospheric-Pressure-Inlet Mass Spectrometry and Its Application to Accurate Mass Measurement Using Time-Of-Flight Mass Spectrometry, Analytical Chemistry, vol. 72, No. 1. 20. Jan. 1, 2000.

Julia M. Lazar, Roswitha S. Ramsey, Steven Sundberg and J. Michael Ramsey, Subattomole-Sensitivity Microchip Nanoelectrospray Source with Time-Of-FlightMass Spectrometry Dectection, Analytical Chemistry, v I. 71 No. 17, 3628-3629, Sep. 1, 1999.

* cited by examiner

*Primary Examiner*—Jack Berman
*Assistant Examiner*—Kalimah Fernandez

(57) ABSTRACT

A source of ions for an analyzer includes a reservoir for containing a liquid, a manifold having a plurality of nozzles, a conduit connecting the reservoir to the manifold and a counter electrode having a potential difference between the counter electrode and the nozzles to enable liquid to be ejected from the nozzles in droplets and to enable ions to be ejected from the droplets.

13 Claims, 7 Drawing Sheets

MICRO MATRIX ION GENERATOR FOR ANALYZERS

CROSS-REFERENCE TO RELATED APPLICATION

This application is a continuation-in-part of and claims the benefit of priority under 35 U.S.C. 120 of prior U.S. application Ser. No. 09/505,910 filed Feb. 17, 2000 now U.S. Pat. No. 6,627,880, the disclosure of the prior application is considered part of and incorporated by reference in the disclosure of this application.

STATEMENT REGARDING FEDERALLY SPONSORED RESEARCH OR DEVELOPMENT

This invention has been created without the sponsorship of funding of any federally sponsored research or development program.

BACKGROUND OF THE INVENTIONS

1. Field of the Inventions

The present inventions relate to methods and apparatus for producing ions, and have particular application to structures and methods including microelectronic micro-structures used for producing ions from liquids, for example to produce ions for mass spectrometers and the like.

2. Related Art

Mass spectrometers and other analyzers have been used to determine the properties or characteristics and quantities of unknown materials, many of which are present in only minute quantities. Many such analyzers function by determining the quantity of material present in an unknown solution as a function of the relationship between the mass and the charge on ions provided to the analyzer by a source of ions. The ability of the analyzer to produce reliable results depends in part on the ability of the source of ions to produce a maximum number of individual ions for a given amount of input material.

Electro-spray ion sources are one type of source of ions for analyzers. Typical ion generation from electro-spray ion sources peaks at a certain ion generation level for a given system due to coalescing or nucleation of charged and un-charged droplets as the droplet density increases in the high electrostatic field. Most of the coalesced, larger-than-original droplets fail to eject ions from their surfaces due to new conditions and subsequently larger droplets. Larger droplets mean that their kinetic inability to reach a critical minimal volume reduces the likelihood that ions will be ejected, regardless of the liquid flow rate available for electro-spray. For example, typical liquid ion source devices have a single liquid conduit producing droplets in a range of sizes from sub-micron diameters to hundreds of microns in diameter. Ions are ejected from smaller aerosol droplets when and if the droplet reaches a critical smaller dimension and if the repulsive internal charge becomes greater than the surface tension holding the droplet in its spherical shape. Absent a critical dimension and a suitable repulsive internal charge, few or no ions are ejected. A high percentage of the droplets do not reach critical volume, resulting in a low ion yield.

SUMMARY OF THE INVENTIONS

Methods and apparatus are described for improving the production of ions from bulk liquids and other materials, for example for use in mass spectrometers and other analyzers, and providing for greater control and redundancy in ion delivery systems. One or more aspects of these methods and apparatus also provide for ion production which may approach linearity in proportion to flow rate. Moreover, these methods and apparatus may be particularly suited to micro-miniaturization.

In accordance with one aspect of the present inventions, a source of ions for an analyzer includes a liquid source such as a reservoir for containing a liquid and a channel having a first end opening into the reservoir. The source of ions also may include a droplet emission element or assembly such as a nozzle element adjacent a second end of the channel that may also include a plurality of tips for producing individual droplets from the liquid. The plurality of tips reduces the likelihood that individual droplets will coalesce, increases the production of ions from bulk liquids and other materials in an approximately linear relationship, and increases the overall flow of material or analyte to the mass spectrometer, which gives a higher current output and a greater signal for the analyzer. They also provide a level of redundancy in the delivery of liquid for producing droplets. With micro-miniaturization, the individual droplets are relatively small, thereby increasing the likelihood that ions would be ejected from the droplet surfaces under the influence of an electric field.

In one form of one aspect of the present inventions, the channel may feed into a manifold which can be used to more efficiently provide fluid to the nozzle element. Additionally, multiple nozzle elements can be used to more selectively deliver fluid droplets to the inlet of the analyzer, or to increase the overall flow rate of droplets from the reservoir.

In another form of one aspect of the present inventions, the plurality of tips are arranged linearly with respect to each other for ease of use and for ease of manufacture. Additionally, or alternatively, tips may be arranged so that all of the tips are spaced apart from each other in all directions from a center point. Such an arrangement may define a circle filled with spaced apart tips extending outwardly from a surface. In one form, the tips have a volcano or truncated cone shape for the desired fluid delivery, electrostatic effects and manufacture ability. Additionally, parallel arrangements of tips may produce parallel beams or streams of ions with a lower probability of coalescing in the path between the tips and a counter electrode and the analyzer.

In still another form of one aspect of the present inventions, a source of ions for an analyzer includes a liquid supply for supplying analyte to a nozzle or nozzles pointing in a first direction and a counter electrode spaced from the nozzle in the first direction. Means are provided for creating an electric field in the vicinity of the nozzle for producing ions from droplets ejected from the nozzle. Each nozzle may include a plurality of tips extending in the first direction for producing droplets from each of the tips. Supplying the analyte as a liquid and producing multiple droplets improves the efficiency and the ion production of the system, and also allows operation of the system at ambient pressures. Consequently, the ion delivery system is easier to manufacture, use and maintain.

In a further form of one aspect of the present inventions, ions are produced from a liquid by passing a liquid along a first channel and into a plurality of second channels terminating in respective openings facing at least partly toward a counter electrode. An electric field is produced so that there is a potential difference between the fluid at the respective openings and the counter electrode. As before, supplying the analyte as a liquid and producing multiple droplets improves the efficiency and the ion production of the system. Additionally, the method of producing ions can be carried out at ambient pressures. The counter electrode may be spaced sufficiently from the tips to allow sufficient time for the ions to be ejected from the droplets and/or for the droplets to evaporate. The counter electrode can be facing the tips or can be oriented at an angle relative to the tips. For example, the counter electrode can be approximately perpendicular to the plane defined by the ends of the tips.

In a still further form of one aspect of the present invention, the plurality of nozzles are arranged at an angle with respect to each other so that each nozzle faces a common point for producing a concentrated flow of ions from the nozzles.

These and other aspects of the present inventions will be further understood after consideration of the drawings, a brief description of which follows, and the detailed description of the several embodiments.

DETAILED DESCRIPTION OF THE EMBODIMENTS OF THE INVENTION

The following specification taken in conjunction with the drawings sets forth the embodiments of the present inventions in such a manner that any person skilled in the art can make and use the inventions. The embodiments of the inventions disclosed herein are the best modes contemplated by the inventor for carrying out the inventions in a commercial environment, although it should be understood that various modifications can be accomplished within the parameters of the present inventions.

The apparatus and methods of the present inventions improve the production of ions and give improved control and redundancy in ion delivery systems. One or more aspects of these methods and apparatus may also provide for ion production that can be linear in proportion to flow rate. Additionally, micro-miniaturization and micro-fabrication techniques can be used to advantage with these methods and apparatus.

The following discussion will focus primarily on electrospray ion delivery systems for use with mass spectrometers, with particular emphasis on those that can be made using micro-electronic fabrication techniques. It is believed that one or more aspects of the present inventions can be easily implemented in any number of different analyzers while still achieving the results obtained with the configurations of the ion delivery systems described herein. However, it should be understood that this specification focuses on applications of the inventions as they may be implemented as an electrospray ion delivery system for mass spectrometers.

Figure 1:
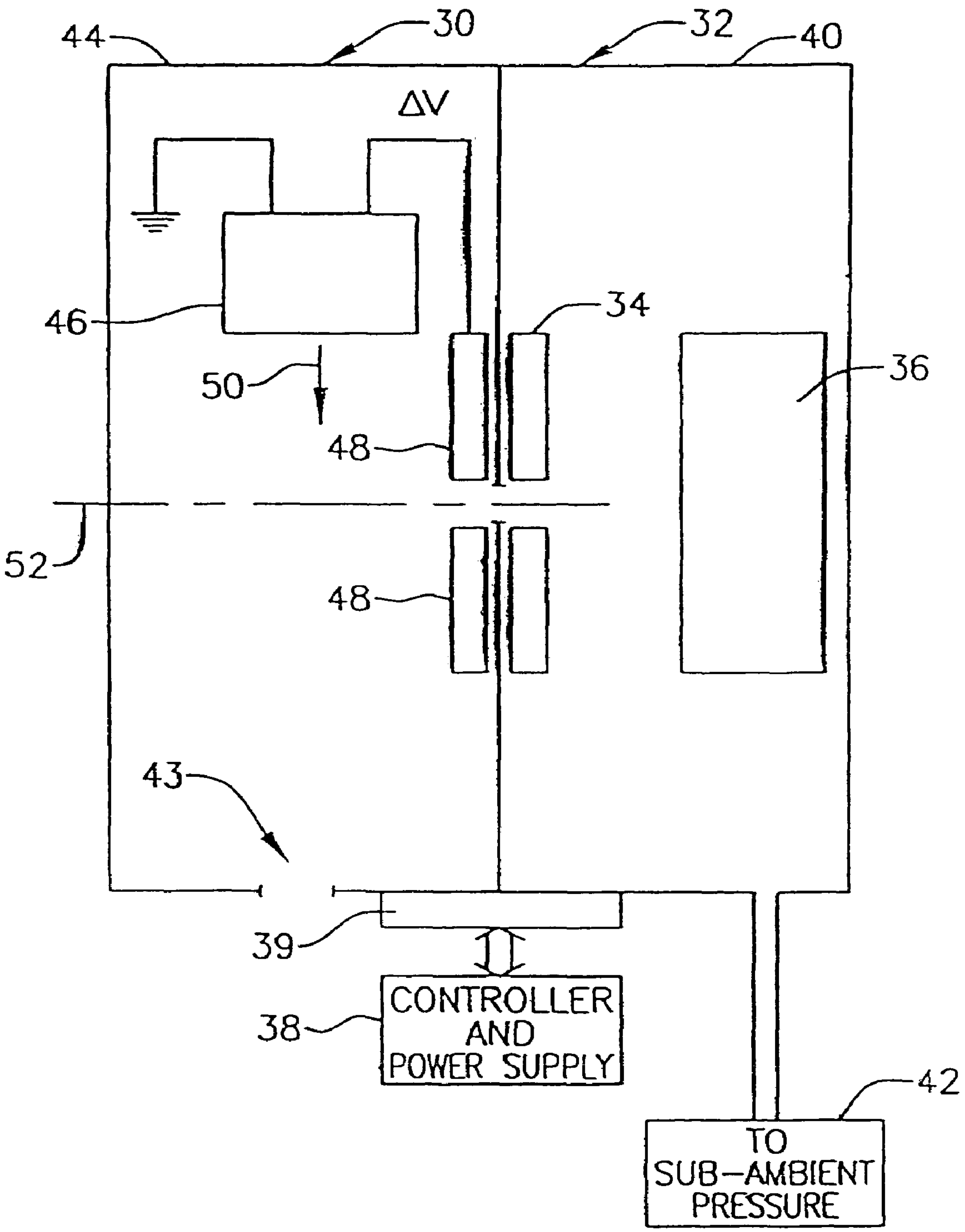
FIG. 1 is a schematic and block diagram of an analyzer and an ion generation system in accordance with one aspect of the present inventions.

In accordance with one aspect of the inventions, an ion delivery system 30 (FIG. 1) is provided which improves production of ions from bulk liquids and other materials and which provides more flexibility in the control and ongoing supply of liquid for producing ions. The ion delivery systems described herein can be used with any number of devices, but will be described herein in conjunction with an analyzer 32, which may be a mass spectrometer such as an ion trap, quadrupole mass filter, time-of-flight, magnetic sector and mobility mass spectrometers, or the like. The analyzer may include a trap, filter or other discrimination element 34 for separating the ions of interest from the remaining particles. The ions of interest are then collected, detected or otherwise analyzed in a detector 36, which sends signals to and is controlled by a controller and power supply assembly 38, which also may have any number of configurations. The controller and power supply assembly 38 provides through an interface 39 whatever power and control signals are necessary for operating the analyzer 32, as well as the ion delivery system 30. The assembly 38 also may receive signals representing the ongoing status of the ion delivery system and the analyzer, and can be configured to respond accordingly. The analyzer is maintained within an enclosure 40 preferably at sub atmosphere pressure by a suitable pump or other vacuum source 42. Typical pressures in the analyzer may be in the range of $10^{-3}$ to $10^{-9}$ Torr (one Torr equals $1/760$ Atmosphere).

The ion delivery system 30 may also be housed within its own enclosure 44, above the pressure of the analyzer 32, and at ambient pressure, as indicated at 43. In other configurations, the ion delivery system 30 can be maintained at about 0.1 atmospheres to about 1.5 atmospheres, while operation could occur outside this range depending on design. Typical operation would be at about one atmosphere. The enclosure 44 can be maintained above the pressure of the analyzer 32 because the ion delivery system is preferably holding and operating on liquids instead of gases. Consequently, the ion delivery system is easier and less expensive to manufacture and easier to use with the analyzer 32. The interface between the ion delivery system 30 and the analyzer 32 can take any number of forms, depending on the type of analyzer being used.

The ion delivery system 30 may include an electro-spray droplet source 46 and a counter electrode or counter electrode assembly 48 maintained at an electric potential Delta V relative to the droplet source 46. The droplet source 46 can be maintained at ground, but it should be understood that the potential difference between the droplet source and the counter electrode 48 can be maintained in any number of ways. For example, the counter electrode can be grounded, or both the droplet source and counter electrode can be at different potentials other than ground. The counter electrode assembly may define a passageway 49 to the detector of the mass spectrometer that has a central longitudinal axis 52.

The voltage difference Delta V can be any number of values from a few volts to thousands of volts. In one embodiment, the voltage can be between 700 to 800 volts and possibly as high as 1400 volts, but preferably still avoiding any electric break down between the tips of the ion source and the counter electrode assembly 48. As will be apparent from some of the dimensions provided herein, the electric field experienced by a droplet produced by the droplet source 46 relative to the counter electrode can be relatively high given the surface areas of the nozzle tips. Consequently, significant latitude in selecting the voltage differences is possible.

The droplet source 46 is preferably oriented so as to eject droplets in a direction 50 approximately perpendicular to the central axis 52. The preferred angle can range from about 70 and 115 degrees, for example, while other angles can be used as well. The benefits of a perpendicular orientation are described in U.S. Pat. No. 5,495,108, the description and drawings of which are incorporated herein by reference.

Figure 2:
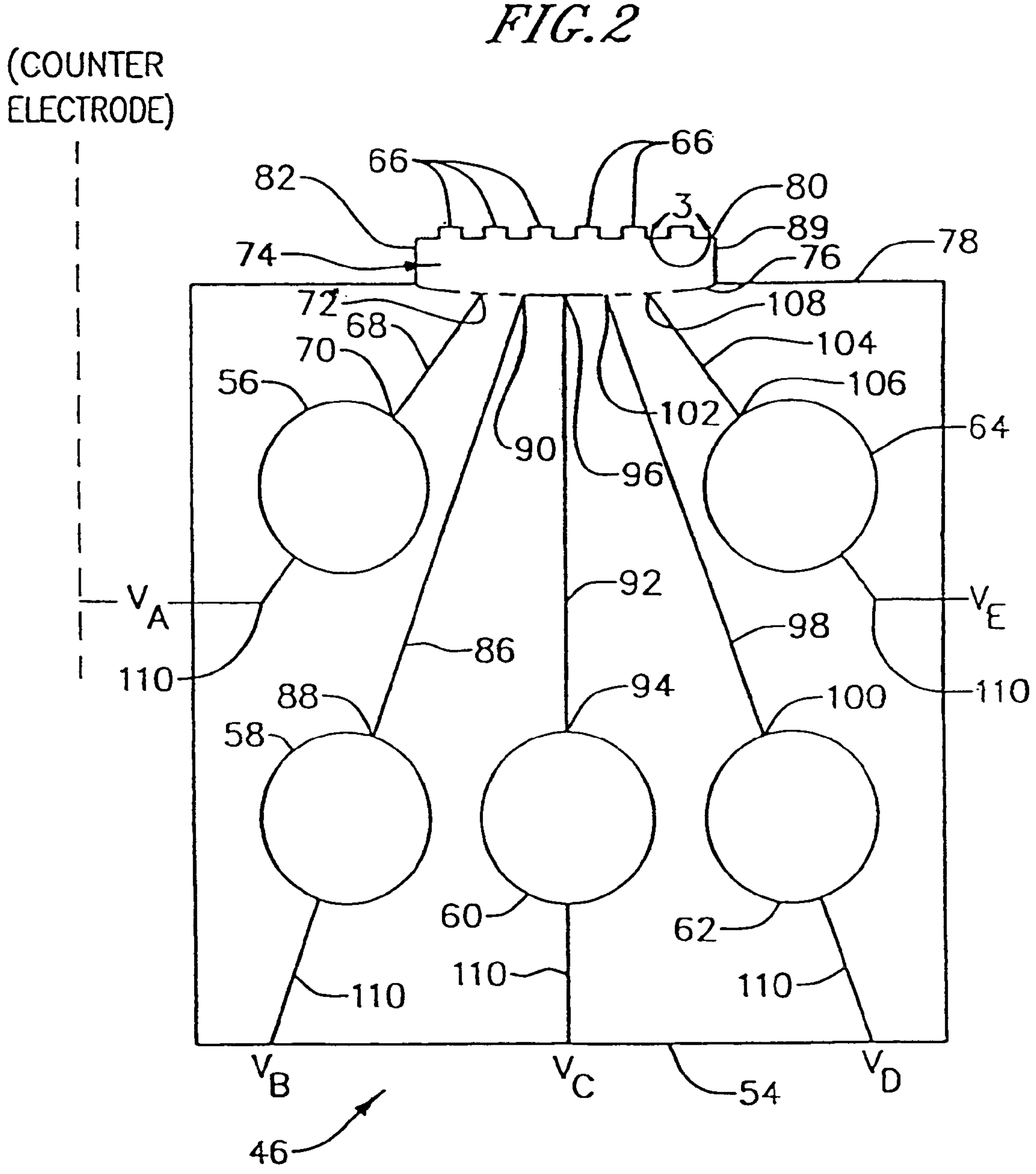
FIG. 2 is a schematic diagram of an ion generation element showing reservoirs and nozzles in accordance with one aspect of the present inventions.

In one embodiment, the droplet source 46 includes a liquid source and a droplet emission system in the form of a reservoir and nozzle array 54 (FIG. 2) for containing liquid and passing the liquid to outlets such as tips for ejecting droplets from the liquid. The array 54 can have one or more reservoirs, such as reservoirs 56, 58, 60, 62, and 64 for containing or holding liquid analyte to be analyzed by the analyzer 32. The reservoirs can be any shape, size or configuration but typically may be circular in plan view and have a depth as may be determined by the particular application or the analyte or analyte samples under consideration. Additionally, in the case of more than one reservoir, the relative positions of the reservoirs can vary according to their size, shapes and according to the size of the array, and also according to their functions or use. However, it is preferred that the positions and configurations of the reservoirs are such as to optimize the delivery of liquid to the outlets or tips while still maintaining adequate control over the flow of liquid and still allowing access to the reservoirs.

The array also may include one or more nozzle elements or assemblies 66 for receiving liquid from one or more of the reservoirs and ejecting the liquid as droplets into an electric field created between the nozzle elements and the counter electrode. Each nozzle can receive liquid from one or more of the reservoirs through any number of flow channel configurations, conduits or the like, as may be determined by the layout of the array, the material from which the array is formed or constructed and the dimensions of the flow channels. As with the size and orientations of the reservoirs, the layout, configurations and dimensions of the flow channels may be determined in part by the desire to optimize the control and the ease of flow of liquid from the reservoir to the nozzle or nozzles. In the embodiment shown in (FIG. 2), the flow channels include a first flow channel 68 having a first end 70 coupled to the first reservoir 56 and a second end 72 opening into a manifold 74 for passing liquid from the first reservoir 56 to the nozzles 66. The channel may be a straight line between the reservoir 56 and the manifold 74. The second end 72 may open out into the manifold 74 at a location which optimizes the flow of liquid from the reservoir 56 to the desired nozzle or nozzles without being affected by and without affecting other channels.

In a preferred embodiment, the manifold 74 may be sufficiently small to minimize excess volume or dead volume while still permitting sufficient flow of liquid to the nozzles. The manifold may include a first wall 76 at which the second end 72 of the channel 68 opens out, along with any other channels coming from respective reservoirs. The wall 76 may be flush or co-linear with a forward wall 78 of the array or may be slightly arcuate or partly circular. Also the nozzles 66 may be formed on, mounted to or extend from a manifold forward wall 80. The depth of the manifold may be defined by the spacing between the wall 76 and the manifold forward wall 80. In one embodiment, the length of the manifold is defined by a first manifold side wall 82 and a second manifold side wall 84, and the width is defined by a top wall and a bottom wall.

A second channel 86 includes a first end 88 opening into the reservoir 58 and a second end 90 opening into the manifold for allowing liquid to flow from the reservoir 58 to the manifold. Likewise, a third channel 92 may include a first end 94 opening into the reservoir 60 and a second end 96 opening into the manifold. A fourth channel 98 includes a first end 100 and a second end 102 for allowing liquid to flow from the reservoir 62 to the manifold. A fifth channel 104 includes a first end 106 and a second end 108 for allowing liquid to flow from the reservoir 64 to the manifold.

One or more contacts, conductors or conductive regions 110 may be associated with respective reservoirs so that an electric potential Delta $V_x$ can be generated between the respective reservoir and the counter electrode so that fluid flows from the reservoir to and out of one or more of the nozzles 66. Each reservoir can then be controlled by appropriate respective voltages Va, Vb, Vc, Vd and Ve to induce liquid flow from the selected reservoir through electrophoresis, where the variable "x" in $V_x$ represents "a", "b", "c", "d" or "e", respectively. Liquids from the appropriate reservoirs can then be selectively caused to flow down the respective channel, into the manifold 74 to be ejected as droplets from the nozzles 66 and into the region between the nozzles 66 and the counter electrode 48.

The array 46 can be constructed or formed in any number of ways. In one approach, the array can be formed from one or more plates of glass or quartz appropriately bonded together. Other non-conductive materials can be used as well. For example, the array can be formed by a first plate substantially square or rectangular along with a projection to form the manifold and nozzles. A second plate having the same outline is formed, cut or etched to include holes to form the reservoirs and a bottom surface is also formed, cut or etched to form respective channels in the bottom surface of the plate. Channels or reservoirs can also be formed in other ways as well, to provide the desired configurations. The first plate then becomes the bottom for the reservoirs and a bottom portion of the channels. The second plate may also be formed, cut or etched in the bottom surface thereof to form the manifold and to form channels or openings to form the nozzles. Alternatively, the array may be formed through microelectronic machining or fabrication such as lithography on non-conductive surfaces.

The nozzle 66 (FIG. 3) may include a wall 112 defining a channel 114 extending from the manifold 74 to a nozzle manifold 116 for passing liquid from the manifold 74 to one or more outlets, ports or tips 118 at the far or distal end 120 of the nozzle. The channel 114 can be a single channel or multiple channels extending from the manifold 74 to the manifold 116 for supplying liquid to the tips 118.

Figure 3:
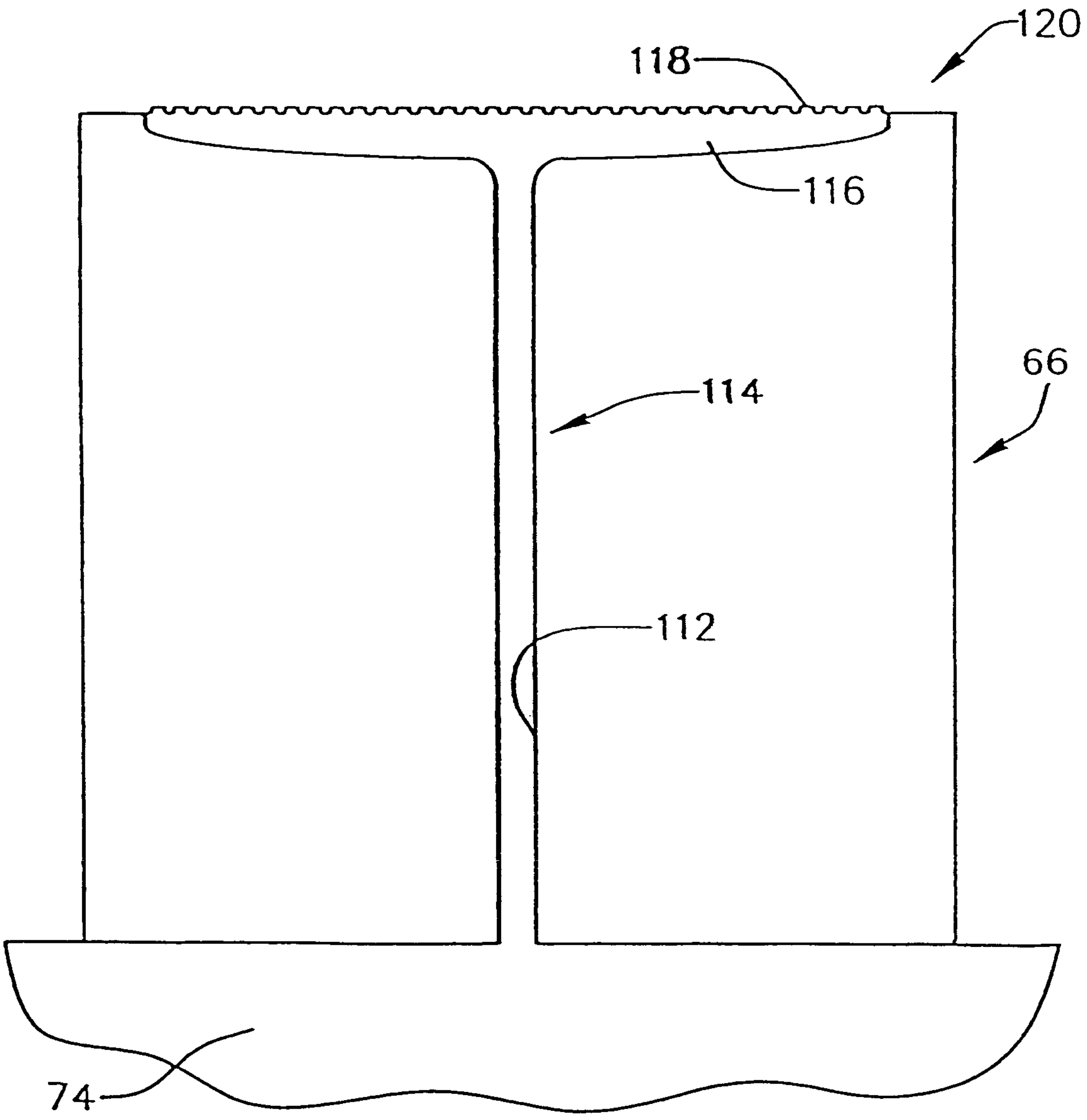
FIG. 3 is a schematic depiction of a nozzle such as that shown in FIG. 2 in accordance with a further aspect of the present inventions.
Figure 5:
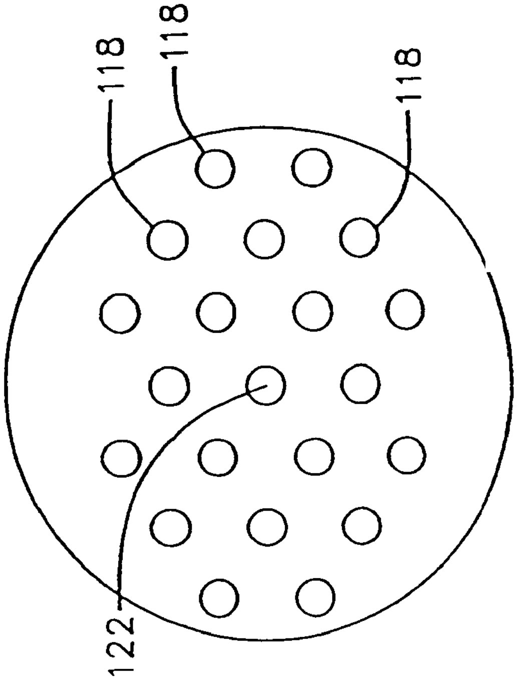
FIG. 5 is a plan view of a nozzle having a plurality of tips in accordance with a further aspect of the present inventions.

The tips 118 can be arranged linearly with respect to each other, as depicted in the sectional view of FIG. 3, they may be arranged spaced apart from each other in all directions from a center 122 (FIG. 5), or they may be arranged to have any number of other configurations. Each tip 118 may be spaced apart from each adjacent tip an equal amount so as to minimize the effects produced on a given tip by adjacent tips. Other configurations are possible as well for distributing or positioning the tips over the surface of the nozzle, including symmetrical and/or asymmetrical.

Figure 4:
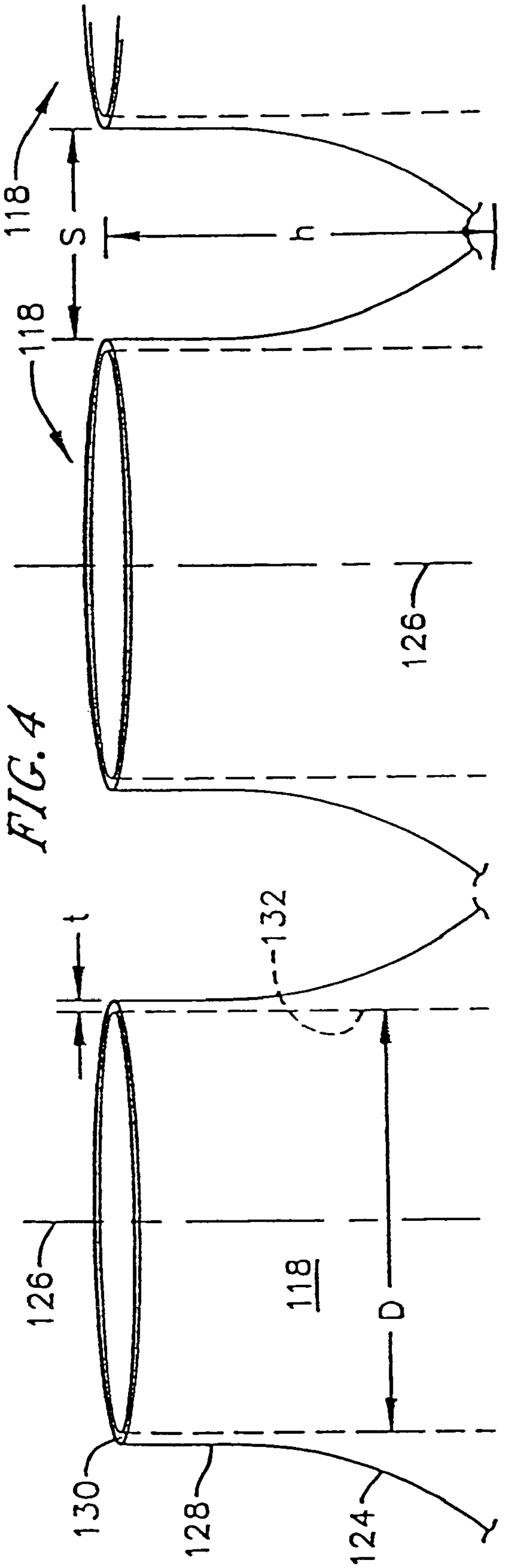
FIG. 4 is a partial cutaway isometric view of several tips or openings on the nozzle of FIG. 3 in accordance with a further aspect of the present inventions.

The dimensions and configurations of the tips may be such as to minimize the restriction to flow of liquid to the tip, minimize the size of the droplets ejected from the tips and to minimize the depositing of residue on the surface on the nozzle. The tips can take any number of forms, and may be substantially straight with a constant wall thickness or they may have a varying wall thickness, but they may have a volcano shape (FIG. 4) or a converging tip end. Each tip may include an outer surface 124 sloping inwardly toward a central axis 126 and outwardly away from the manifold 116 (FIG. 3) generally in the direction of the counter electrode. The outer surface 124 may converge to a substantially cylindrical wall 128, which is substantially circular in cross-section. The cylindrical wall 128 terminates at a flat or squared-off end face 130 and has a thickness "t" (FIG. 4) sufficiently small to minimize the surface area defined by the end face 130 and to minimize obstructions to uniform flow. The interior wall of the tip 132 may have a diameter D of an appropriate size to minimize the size of the droplets ejected from the tip. The diameter D may be constant throughout much of the length of the channel to the tip or may be converging to a similar extent as the outside of the tip, in other words the thickness "t" is relatively constant near the face 130. The diameter of the channel 114 (FIG. 3) may be about 1 to 80 micrometers, typically 20 micrometers, or other dimensions producing an approximately similar cross sectional area.

The height "h" of each tip is preferably sufficient to properly form and eject droplets while minimizing spread or flow of liquid across the surface of the nozzle or depositing of liquid on the nozzle. The height may be approximately similar to or greater than the inside diameter of the tip, and is preferably about or greater than one and one-half times the diameter D. The spacing S between each tip is preferably sufficient to allow formation and ejection of droplets from each tip without interference from the formation and ejection of droplets from adjacent tips, and so that each tip has its own electric field point. The spacing S may be about or greater than one and one-half times the diameter D, to take into account the relationship between the dynamics of the formation of the spherical droplet as it leaves the tip, which droplet diameter depends on the diameter D, and the spacings for adjacent droplets if droplets formed simultaneously.

In one aspect of the present inventions, the tips are spaced from the counter electrode a distance sufficient to allow ions to be ejected from the droplets or for the droplets to evaporate. The counter electrode is may be positioned closer to the analyzer than to the tips and may be spaced in a direction from the tips that is at least partly in the same direction as the line of flight of the droplets, and at least partly in a direction coaxial with the tips. The spacing between the tips and the counter electrode may be about one to five mm, and may be more depending on the mode of operation, the temperature and similar parameters.

In operation, liquid analyte is placed in one or more of the reservoirs 56–64 and the array 46 placed in the ion generator 30. Voltages are applied to the counter electrode and the array, and to one of the reservoirs, such as reservoir 56, to cause liquid to flow from the reservoir along the channel 68 to the manifold 74 and to the nozzles 66. Liquid flows through the channel 114 in the appropriate nozzle out to the manifold 116 and to the tips 118. Droplets are formed through each tip and ejected under the influence of the voltage difference $V_x$ created between the end face 130 and into the droplets and the relative voltage on the counter electrode. Ionized portions of the analyte are then ejected from the droplet and taken into the analyzer. The remainder of the droplet passes the counter electrode and is either deposited or leaves the assembly 30.

Exemplary dimensions can be given for the preferred embodiments, but other dimensions can be used for the same or different configurations while still achieving one or more of the benefits of the present inventions. In one example, the inside diameter of the tip is between about 0.1 and 20.0 micrometer. The outside diameter of the tip may be as close to the inside diameter as possible. The center to center distance between tips can be as small as two micrometers or less. For example, the center to center spacing can be twice or three times or more that of the outside diameter of a tip. The channels to each of the manifolds may be about 20 micrometers in diameter.

In a further form of one aspect of the present inventions, a source of ions 134 (FIG. 6) includes a liquid source 136 such as a reservoir and pump for containing a liquid and transporting the liquid to a manifold 138. The source of ions may also include a droplet emission assembly 140 having a plurality of tips 142, 144, and 146 for producing droplets 148 and ejecting the droplets into an electric field between the tips and a collector 150, which generically may be considered the analyzer, well known to those skilled in the art, but where the analyzer is used simply to measure the flow of ions from the tips, it may take the form of an ammeter 151. The collector may include a power supply, source or generator 152 for producing the electric field between the collector 150 and the tips 142, 144 and 146. In the example shown in FIG. 6, the tips are placed at a potential different from the collector 150 through a copper wire 154 or other conductor to complete the circuit. The wire 154 may encircle and electrically contacts tips 142, 144 and 146, such as by way of respective tubes 156.

In this aspect of the inventions, the tips 142, 144 and 146 can be formed by a well-known drawing process such as is known to those skilled in the art of manufacturing small tubes. The drawing process may be carried out on a plurality of quartz tubes in a bundle to produce a plurality of tubes 156 that are cut at one end 158 and convergent or necked down to the tips 142, 144 and 146 at the other. The tubes may then made somewhat conductive by application of a conductive coating on the outer surfaces of the tubes, such as through a conductive paint or electro-deposition of a suitable conductive material. The wider-diameter ends 158 are press fit into an elastomeric disk 160, such as a Teflon disk, to form a suitable seal between the disk and the tubes. The Teflon disk 160 is then fit into a tube 162 made of plastic or other material to serve as a channel and manifold for liquid before entering the quartz tubes 156. In this embodiment, the outer diameter of the each of the tips may be about two micrometers and the inside diameter of the tip was about one micro-meter. The inlet diameter of the tube may be about 200 micrometers. The tips may be separated from each other by a distance of about 1230 micrometers, and the distance ratio between tips may be between 600 and 1200 micrometers; however, a ratio of separation of between the tips may be 100. The particles produced ranged in size from sub-micrometers in diameter to about two micro-meters. The separation ratio provided a large distance between aerosol particles to reduce their ability to coalesce prior to the ions being collected at the collector.

The tube array may be separated from the collector by a distance of between three and 9 mm, with a suitable distance being about 8 mm. In this configuration, the tubes and the collector may be oriented with respect to each other to be coaxial. A voltage was applied to the tube array of between 1000 and 1400 volts. With this arrangement, ion detection as measured by observed current can have a direct correlation to the number of tubes.

In a further form of the present inventions, a source of ions may include tubes 163 having tips 164 similar to the tips 142, 144 and 146, having opposite ends 166 in fluid communication with a manifold 168 for supplying liquid to the tips 164. The tubes 163 pass through respective openings in a lower housing 170 and are sealed and held in place by respective O-rings 172. The ends 166 of the tubes are pressed or otherwise fit into respective openings in a seal plate 174, which is then pressed or otherwise placed against the O-rings 172 to help seal the tubes and hold them in place. An upper housing 176 seals with and covers the lower housing 170 to form the manifold 168. A fitting 178 couples with a tube or other liquid supply for supplying liquid analyte to the manifold.

The O-rings may also take the form of gaskets, and they are preferably formed from conductive polymers, such as graphite or silver impregnated polymer, such as polyimide. The conductive O-rings or gaskets may be about 1.2 mm inside diameter.

Figure 8:
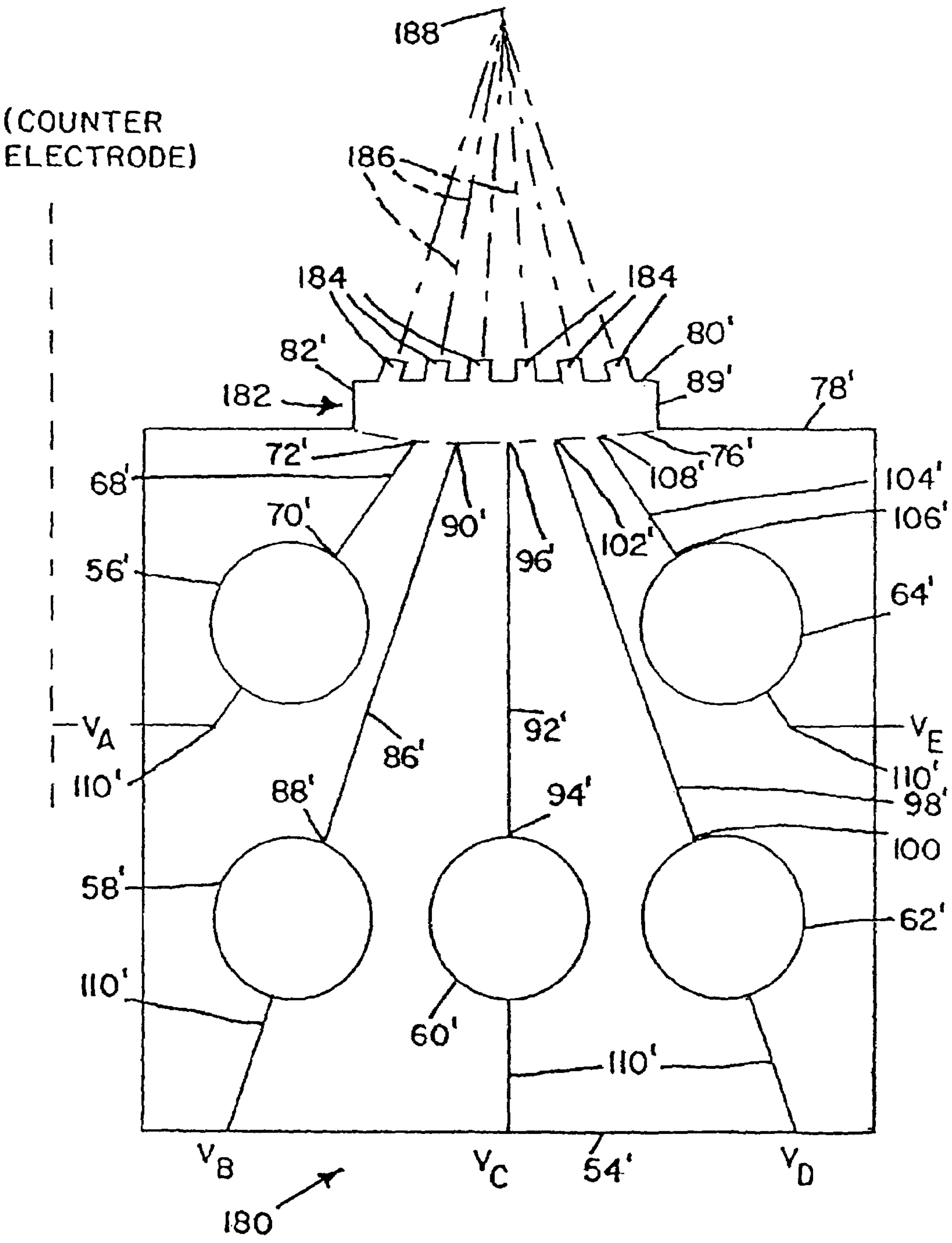
FIG. 8 is a schematic diagram similar to FIG. 2 of a still further aspect of the present invention.

A modified electro-spray droplet source, generally indicated by the reference numeral 18, is illustrated in FIG. 8. Droplet source 180 is similar to the droplet source 46 shown in FIG. 2. Elements of droplet source 180 that are identical to those of droplet source 46 are identified with the same reference numerals with the addition of a prime.

Droplet source 180 includes a manifold, generally indicated by the reference numeral 182 that is similar to manifold 74 of droplet source 46. Portions of manifold 182 that are identical to those of manifold 74 are identified with the same reference numerals with the addition of a prime. Modified 182 may have a plurality of nozzle elements or assemblies 184 for receiving liquid from one or more of the reservoirs and ejecting the liquid as droplets into an electric field created between the nozzle elements and the counter electrode. The nozzles 184 are oriented so that the central longitudinal axis of each nozzle converge to a smaller area of transition 188 as indicated by the reference numeral 186 for maximizing the transition of ions through an opening into a vacuum chamber of an analyzer, for example. Each nozzle 184 may include a second manifold and a plurality of outlet parts or tips similar to that of 66 as shown in FIG. 3.

Figure 6:
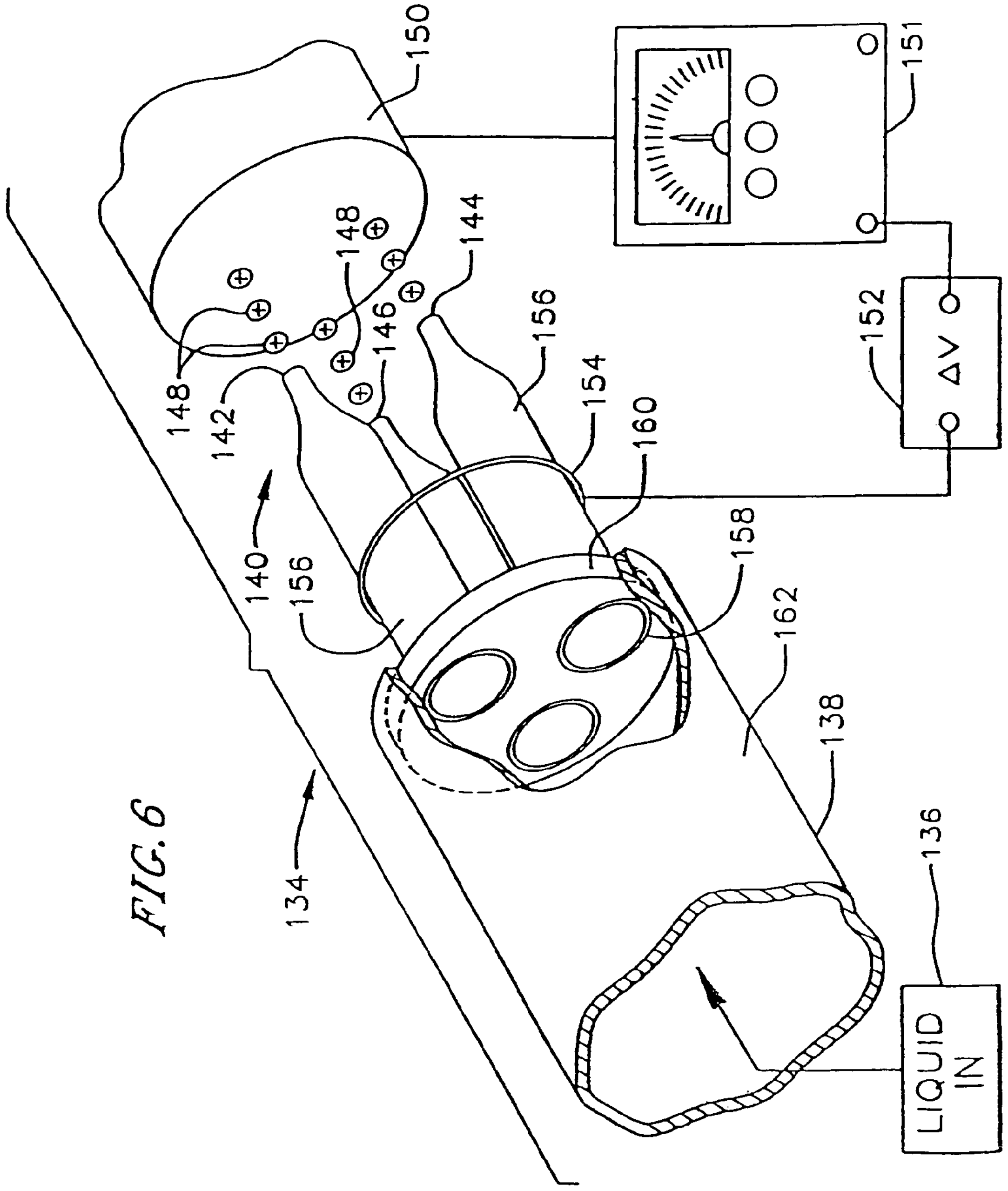
FIG. 6 is an isometric, partial cutaway view and partial schematic of a further embodiment of an ion generation assembly in accordance with another aspect of the present inventions.
Figure 7:
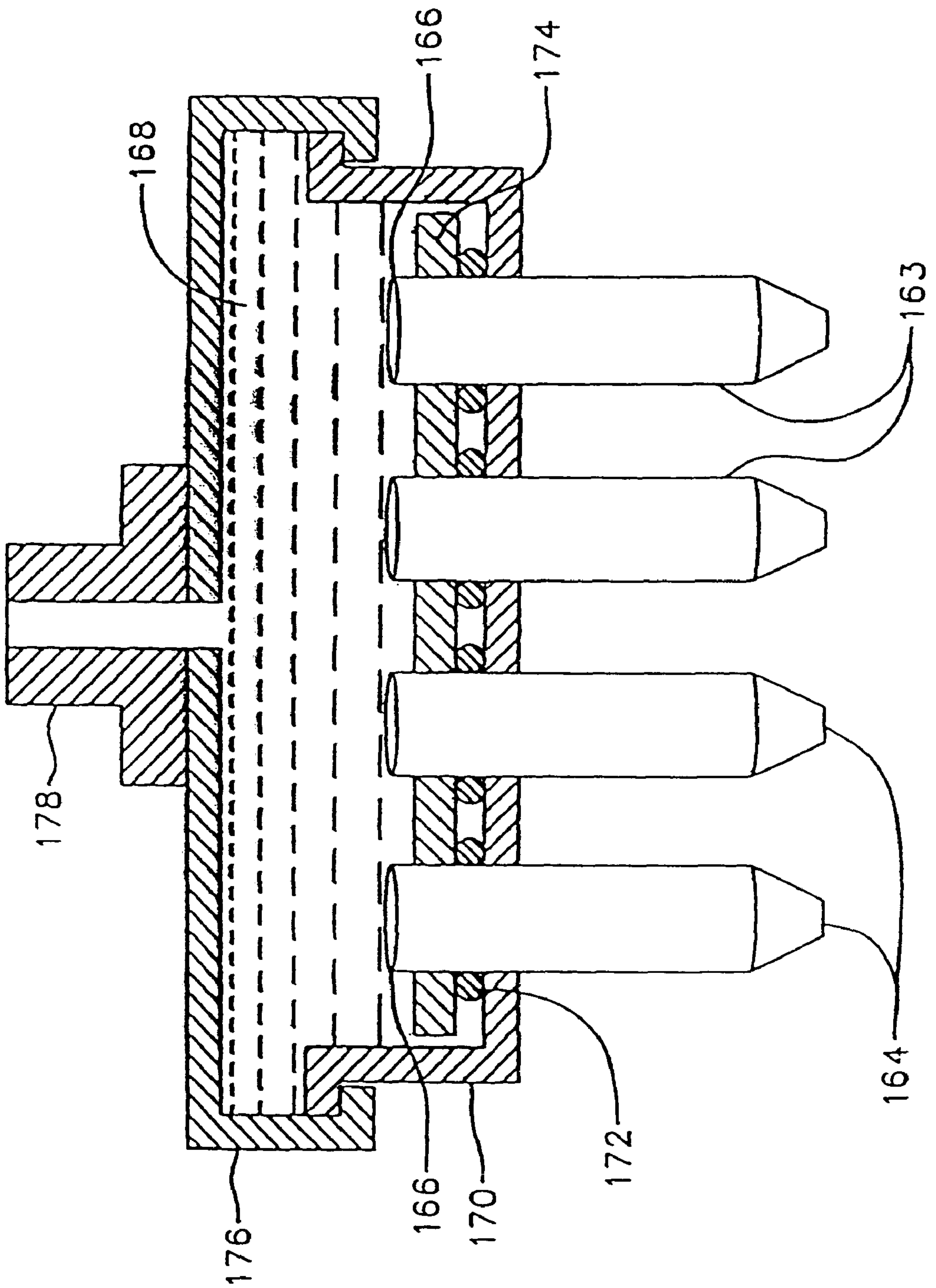
FIG. 7 is a partial vertical section and schematic of a further alternative embodiment of an ion generation assembly in accordance with another aspect of the present inventions.

Other droplet source embodiments such as those of FIGS. 6 and 7 that include a plurality of nozzle elements or tubes may also have their tubes or tips arranged so that their longitudinal axes converge to a point.

Having thus described several exemplary implementations of the invention, it will be apparent that various alterations and modifications can be made without departing from the inventions or the concepts discussed herein. Such operations and modifications, though not expressly described above, are nonetheless intended and implied to be within the spirit and scope of the inventions. Accordingly, the foregoing description is intended to be illustrative only.

What is claimed is:

1. An electrospray source of ions for an analyzer comprising:

(a) a reservoir for containing a liquid;

(b) a manifold for containing a liquid, said manifold having a plurality of nozzles, each of said nozzles having a channel and a plurality of outlets operatively connected to said channel, wherein the plurality of outlets are for ejecting droplets;

(c) a conduit connecting said reservoir to said manifold so that liquid in said manifold can flow from said reservoir through the channel of each of said nozzles and through said outlets; and (d) a counter electrode having an electrical potential difference between said counter electrode and said outlets, said electrical potential difference and the size of said outlets being sufficient to enable said liquid to be ejected from said outlets in droplets and to enable ions to be ejected from said droplets.

2. The electrospray source of ions as recited in claim 1, wherein there is a plurality of reservoirs and a plurality of conduits for connecting said reservoirs to said manifold.

3. The electrospray source of ions as recited in claim 1, wherein said nozzles are arranged in a pattern so that each of said nozzles is substantially evenly spaced from adjacent nozzles.

4. The electrospray source of ions as recited in claim 1, further comprising an electrode for producing an electric potential at said reservoir to induce liquid flow from said reservoir to said manifold.

5. The ion source as recited in claim 1, wherein the major dimension of each of said outlets is from about 0.1 micrometer to about 20 micrometers.

6. The ion source as recited in claim 1, wherein each of said nozzles has a central longitudinal axis and the central longitudinal axes of said nozzles converge to an area in front of said nozzles.

7. A mass analyzer comprising:

(a) a reservoir for containing a liquid;

(b) a manifold for containing a liquid, said manifold having a plurality of openings, wherein said manifold further comprises a plurality of spaced tips that contain said openings and wherein each of said tips has a central longitudinal axis and the central longitudinal axes of said tips converge at an area in front of said tips;

(c) a channel connecting said reservoir to said manifold so that liquid in said reservoir can flow from said reservoir to said openings;

(d) a detector for analyzing ions; and (e) a counter electrode between said manifold and said detector and having an electrical potential difference between said counter electrode and said openings, said electrical potential difference and the size of said openings being sufficient to enable said liquid to be ejected from said openings in droplets and to enable ejection of ions from said droplets towards said detector.

8. The mass analyzer as recited in claim 7, wherein each of said openings is circular and has a diameter from about from 0.1 micrometer to about 20 micrometers.

9. The mass analyzer as recited in claim 7, wherein said tips are arranged in a pattern so that each of said tips is evenly spaced from adjacent tips.

10. The mass analyzer as recited in claim 7, wherein said manifold comprises:

(a) upper housing connected to said conduit; and (b) a lower housing connected to said upper housing and containing said tips.

11. The mass analyzer as recited in claim 10, wherein said lower housing has a plurality of apertures and a plurality of tubes comprising said tips and located in said apertures, each of said tubes having a seal at the aperture through which the tube extends.

12. The mass analyzer as recited in claim 7, further comprising an electrode for producing an electric potential at said reservoir to induce liquid flow from said reservoir to said manifold.

13. The mass analyzer as recited in claim 7, wherein there is a plurality of reservoirs and a plurality of conduits for connecting said reservoirs to said manifolds.

* * * * *

UNITED STATES PATENT AND TRADEMARK OFFICE

CERTIFICATE OF CORRECTION

PATENT NO. : 6,967,324 B2
DATED : November 22, 2005
INVENTOR(S) : Goodley et al.

It is certified that error appears in the above-identified patent and that said Letters Patent is hereby corrected as shown below:

Title page,
Item 56, References Cited, OTHER PUBLICATIONS, delete "Dectection," and insert -- Detection, --.

Column 10,
Line 43, delete "from" before "0.1".

Signed and Sealed this

Eleventh Day of April, 2006

JON W. DUDAS
*Director of the United States Patent and Trademark Office*